(12) United States Patent
Abe

(10) Patent No.: US 7,075,778 B2
(45) Date of Patent: Jul. 11, 2006

(54) HYBRID GAS-INSULATED SWITCHGEAR

(75) Inventor: Kosuke Abe, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 232 days.

(21) Appl. No.: 10/632,827

(22) Filed: Aug. 4, 2003

(65) Prior Publication Data
US 2004/0037025 A1 Feb. 26, 2004

(30) Foreign Application Priority Data
Aug. 6, 2002 (JP) ............................. 2002-228376

(51) Int. Cl.
*H02B 5/00* (2006.01)
(52) U.S. Cl. ..................... 361/602; 218/79; 218/80; 361/605; 361/611; 361/619
(58) Field of Classification Search ............ 218/43–88; 361/601–605, 611–612, 618–621
See application file for complete search history.

(56) References Cited

U.S. PATENT DOCUMENTS

| | | | | |
|---|---|---|---|---|
| 4,032,820 A | * | 6/1977 | Oishi et al. .................. 361/604 |
| 4,209,821 A | * | 6/1980 | Kobayashi et al. ......... 361/612 |
| 4,468,716 A | * | 8/1984 | Kamata et al. ............. 358/300 |
| 5,126,917 A | * | 6/1992 | Matsuda ..................... 361/603 |
| 5,796,060 A | * | 8/1998 | Fuchsle et al. .............. 218/79 |
| 6,660,955 B1 | * | 12/2003 | Bues ........................... 218/79 |

FOREIGN PATENT DOCUMENTS

| | | |
|---|---|---|
| CN | 1336708 A | 2/2002 |
| JP | 62-181606 (A) | 10/1987 |
| JP | 2000-308219 (A) | 11/2000 |

* cited by examiner

*Primary Examiner*—Gregory Thompson
(74) *Attorney, Agent, or Firm*—Sughrue Mion, PLLC

(57) ABSTRACT

A hybrid gas-insulated switchgear constitutes an electrical circuit for a single-line diagram unit by arranging one first standardized module and two second standardized modules in a single row such that the central axes of tanks are generally aligned and electrically connecting them to each other. In the standardized modules, a circuit breaker and disconnecting switches are housed inside the tanks such that the disconnecting switches are positioned at first and second ends of the circuit breaker so as to line up generally in a straight line, and grounding switches are connected between the circuit breaker and the disconnecting switches.

4 Claims, 13 Drawing Sheets

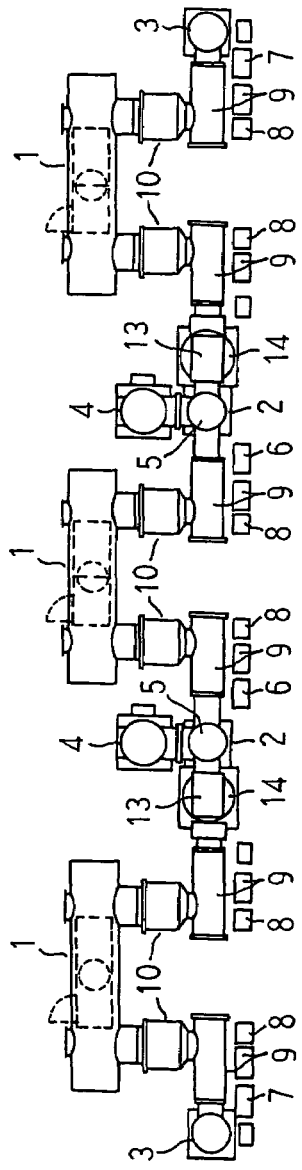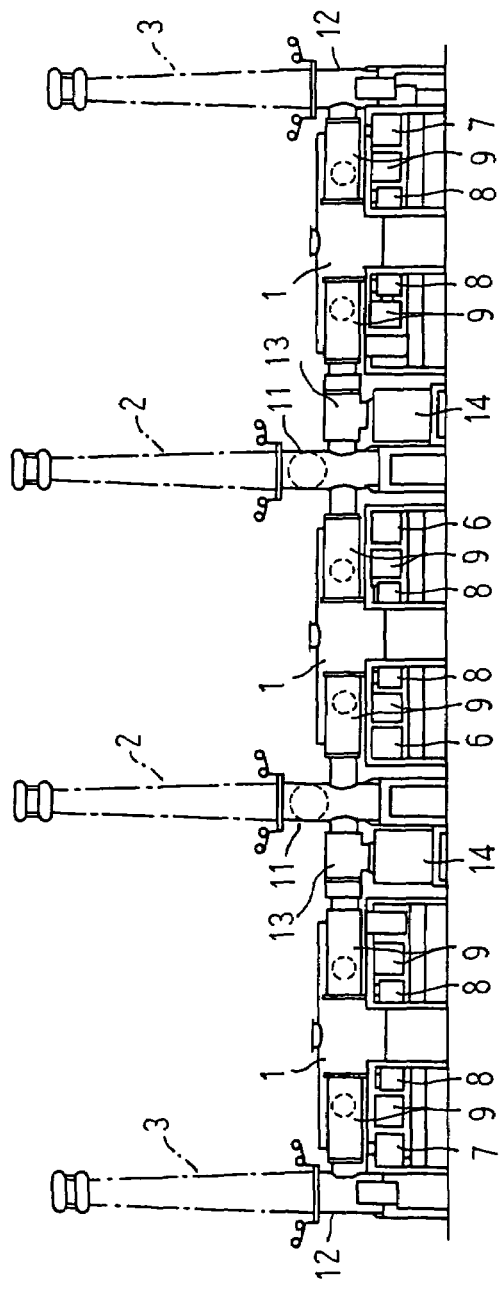
FIG. 13A PRIOR ART
FIG. 13B PRIOR ART

HYBRID GAS-INSULATED SWITCHGEAR

BACKGROUND OF THE INVENTION

1. Field of the Invention

The present invention relates to a hybrid gas-insulated switchgear in which a single-line diagram unit is constructed by arranging and connecting in series modules each formed by housing a circuit breaker, disconnecting switches, grounding switches (earthing switches), etc., together inside a single tank segregated into gas compartments.

2. Description of the Related Art

A 1½ circuit breaker system gas-insulated switchgear constituting a switchgear portion of a transformer facility in which electric power transmission lines and buses are constituted by overhead lines is described in Japanese Patent Laid-Open No. HEI 11-69532 (Gazette), for example.

FIGS. 13A and 13B are diagrams explaining a construction of a conventional 1½ circuit breaker system (hereinafter "CB system") gas-insulated switchgear such as that described in Japanese Patent Laid-Open No. HEI 11-69532 (Gazette), for example, FIG. 13A showing a plan thereof and FIG. 13B showing a front elevation thereof.

In FIGS. 13A and 13B, three circuit breakers 1 are disposed in a straight line, current transformers 10 are connected to first and second ends of each of the circuit breakers 1, and a disconnecting switch 9 and a grounding switch 8 for inspection are connected to each of the current transformers 10. Line bushing cases 11 are each disposed between the disconnecting switches 9, line bushings 2 for connection to electric power transmission lines or circuits of transformers, etc., being mounted to each of the line bushing cases 11. Bus bushing cases 12 are each disposed outside the disconnecting switches 9 at first and second ends of the apparatus, bus bushings 3 for connection to main buses being mounted to each of the bus bushing cases 12. Line grounding switches 6 are connected between the line bushings 2 and the disconnecting switches 9, lightning arresters 4 and lightning arrester disconnecting switches 5 are connected to the line bushings 2, and bus grounding switches 7 are connected near the bus bushing 3. Finally, connection buses 13 are each added between one of the line bushing cases 11 and one of the circuit breakers 1, gas-insulated voltage transformers 14 being disposed below the connection buses 13.

Thus, in a conventional gas-insulated switchgear, an electrical circuit for a single-line diagram unit is constructed by combining items of electrical equipment such as the circuit breakers 1, the disconnecting switches 9, the grounding switches 6, 7, and 8, etc. The items of electrical equipment such as the circuit breakers 1, the disconnecting switches 9, the grounding switches 6, 7, and 8, etc., are each disposed inside a separate tank, electrical insulation space being disposed between each of the tanks.

Because a conventional gas-insulated switchgear is constructed in the above manner, one problem has been that tanks for housing the electrical equipment are enormous size and electrically-insulating spacers are disposed between each of the tanks, preventing reductions in size and cost.

Furthermore, when an electrical facility such as a transformer substation or a generating station, etc., is being freshly installed or added to, because the tanks in which the circuit breakers 1, the disconnecting switches 9, the grounding switches, etc., are each housed must be carried to the site, and the tanks must be arranged and connected on site so as to provide adequate distance between each of the items of electrical equipment, and the line and bus bushings must also be mounted, other problems have been that the installation footprint is large, the installation workload is increased, and installation time is prolonged.

SUMMARY OF THE INVENTION

The present invention aims to solve the above problems and an object of the present invention is to provide a hybrid gas-insulated switchgear enabling reductions in size and cost to be achieved, and also enabling on-site installation workloads to be reduced and installation time to be shortened in new construction of and additions to electrical facilities by housing together and modularizing a plurality of items of electrical equipment inside a single tank and constructing an electrical circuit of a single-line diagram unit by arranging and connecting a plurality of the modules in series to enable reductions in the number of tanks required for housing the items of electrical equipment.

With the above object in view, a hybrid gas-insulated switchgear of the present invention includes a plurality of modules, each module being provided with: a cylindrical tank disposed such that an axial direction thereof is generally horizontal, the tank being filled with an electrically-insulating gas and sealed; a circuit breaker disposed inside the tank such that a direction of an opening and closing operation thereof is generally aligned with the axial direction of the tank; disconnecting switches disposed at first and second ends of the circuit breaker inside the tank, the disconnecting switches being electrically connected to the circuit breaker; and grounding switches electrically connected between the circuit breaker and the disconnecting switches. The hybrid gas-insulated switchgear is characterized in that the plurality of modules is arranged in a single row such that central axes of the tanks are generally aligned and the plurality of modules is electrically connected to each other to constitute a single-line diagram unit.

Therefore, the number of tanks used is significantly reduced, thereby providing a hybrid gas-insulated switchgear enabling reductions in size and cost to be achieved, and also enabling on-site installation workloads to be reduced and enabling installation time to be shortened in new construction of and additions to electrical facilities.

BRIEF DESCRIPTION OF THE DRAWINGS

FIG. 13A is a plan explaining a construction of a conventional 1½ circuit breaker system gas-insulated switchgear; and FIG. 13B is a front elevation explaining the construction of the conventional 1½ circuit breaker system gas-insulated switchgear.

DETAILED DESCRIPTION OF THE PREFERRED EMBODIMENTS

Preferred embodiments of the present invention will now be explained with reference to the drawings.

Embodiment 1

Figure 1:
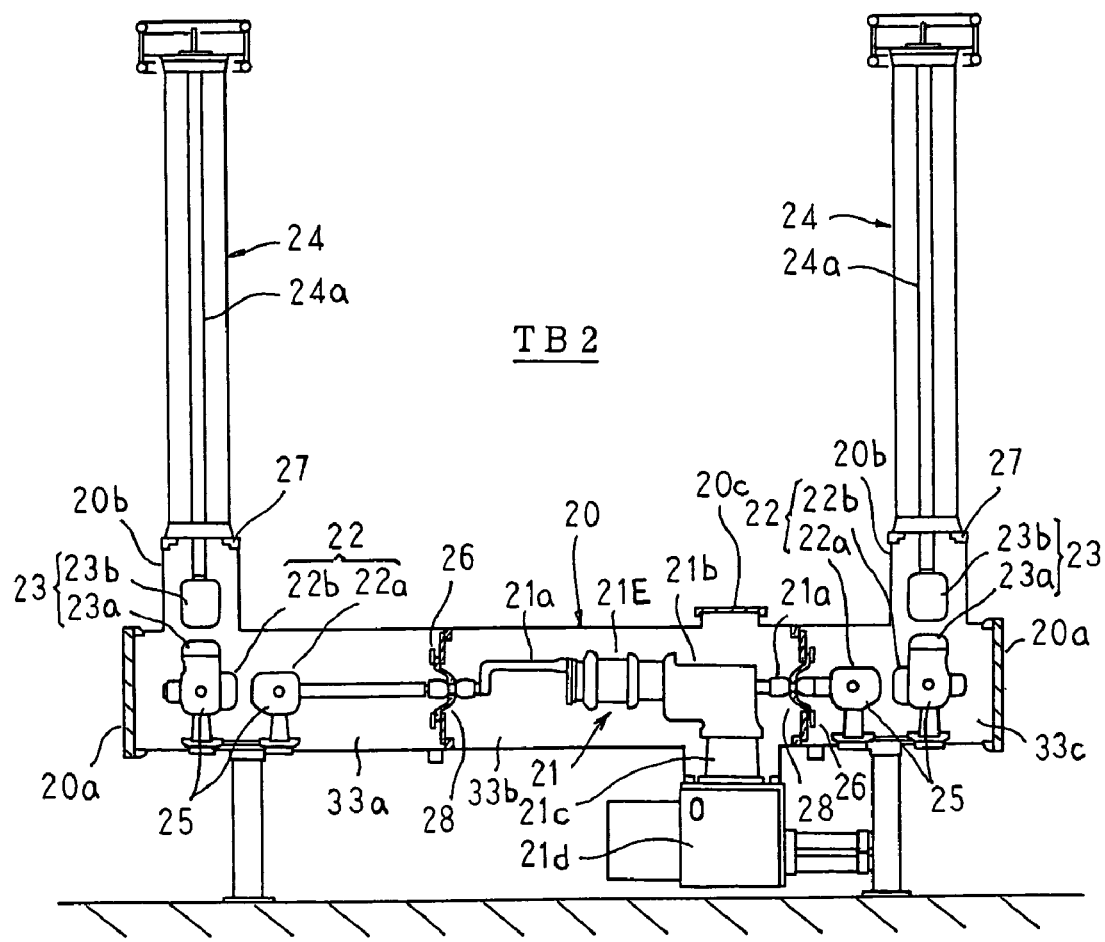
FIG. 1 is a cross section showing a first standardized module TB2 constituting part of a hybrid gas-insulated switchgear according to Embodiment 1 of the present invention.
Figure 2:
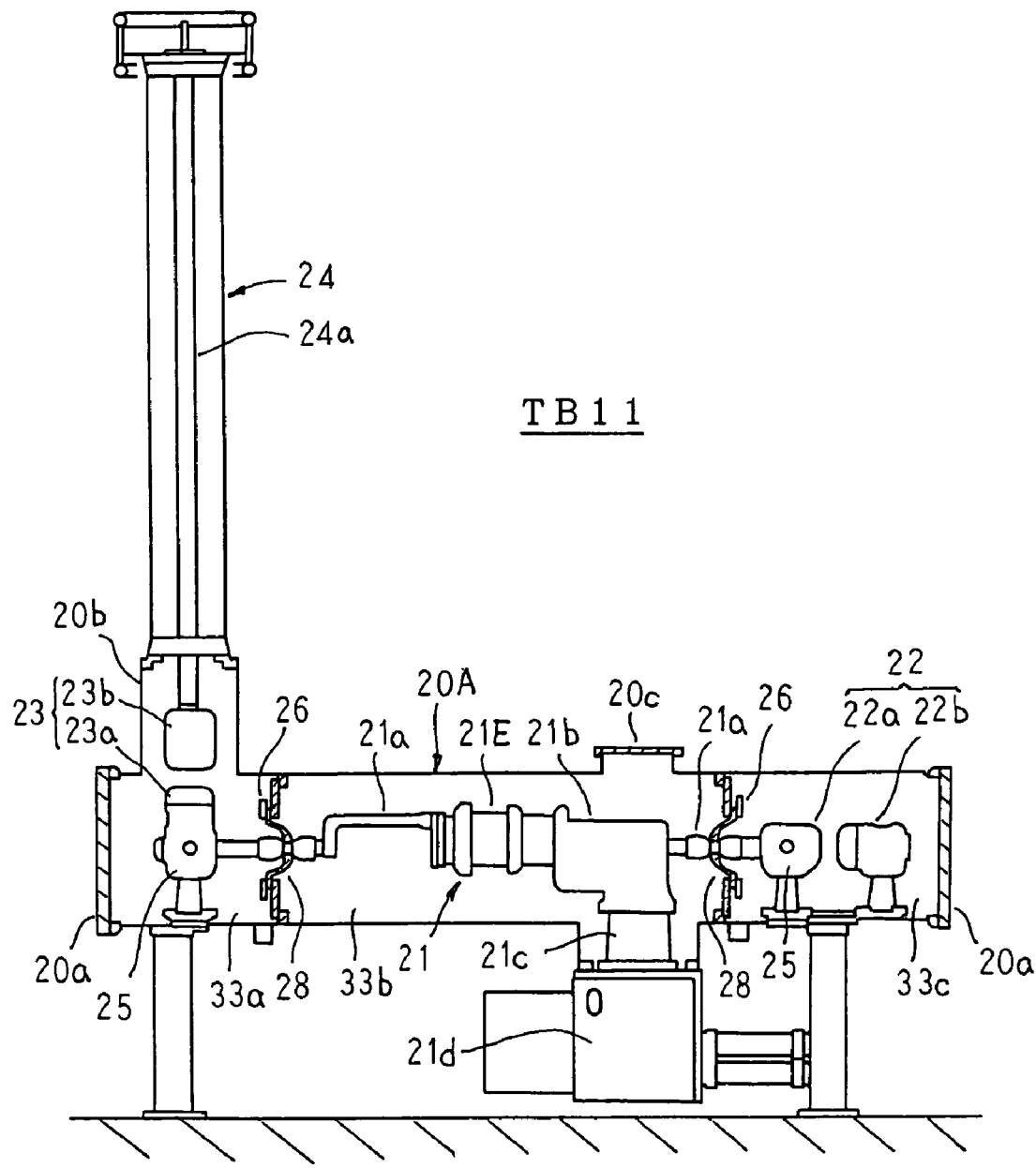
FIG. 2 is a cross section showing a second standardized module TB11 constituting part of the hybrid gas-insulated switchgear according to Embodiment 1 of the present invention.
Figure 3:
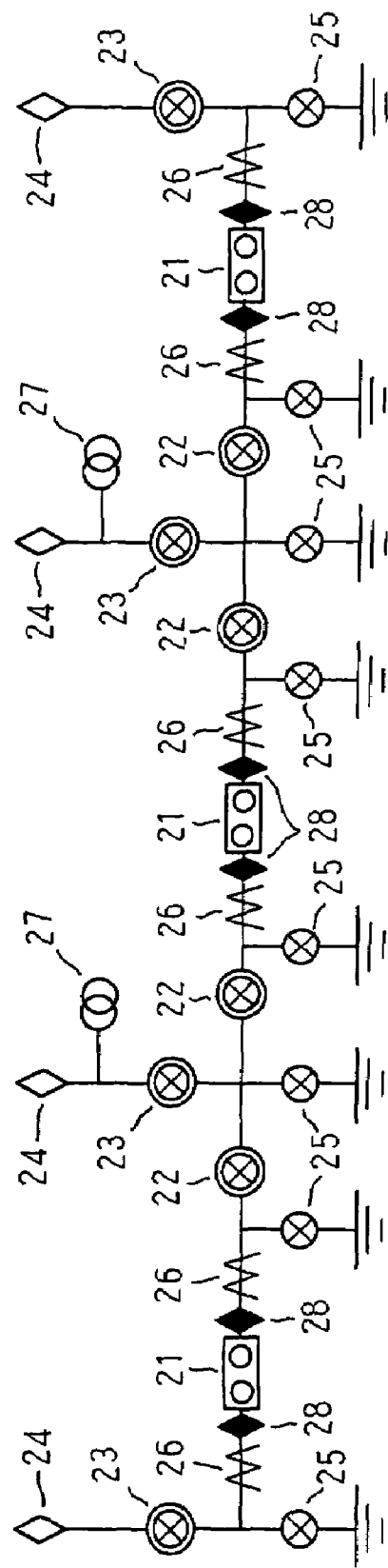
FIG. 3 is an electrical circuit diagram showing a single-line diagram unit of a 1½ circuit breaker system according to Embodiment 1 of the present invention.
Figure 4:
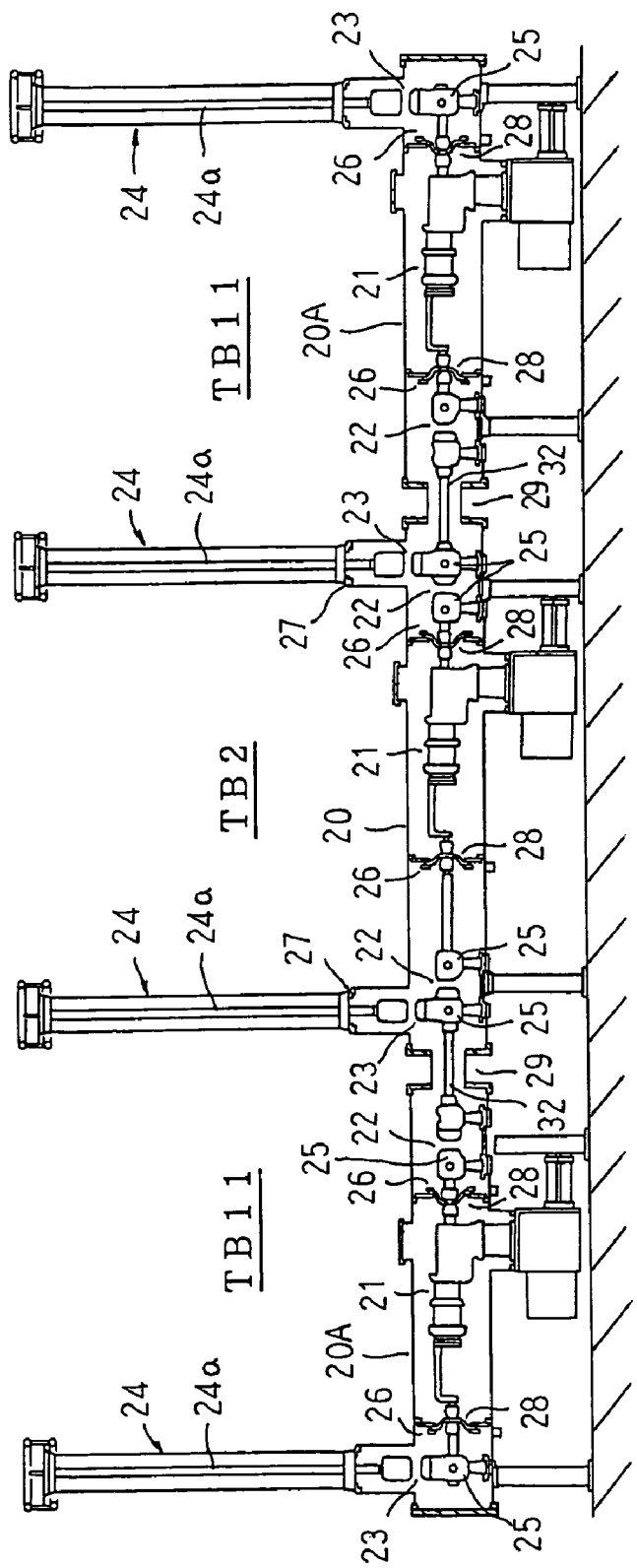
FIG. 4 is a configuration diagram of the hybrid gas-insulated switchgear constituting the single-line diagram unit of the 1½ circuit breaker system according to Embodiment 1 of the present invention.

FIGS. 1 and 2 are cross sections showing first and second standardized modules TB2 and TB11, respectively, constituting a hybrid gas-insulated switchgear according to Embodiment 1 of the present invention, FIG. 3 is an electrical circuit diagram showing a single-line diagram unit of a 1½ circuit breaker system according to Embodiment 1 of the present invention, and FIG. 4 is a configuration diagram of the hybrid gas-insulated switchgear constituting the single-line diagram unit of the 1½ circuit breaker system according to Embodiment 1 of the present invention.

A first standardized module TB2, as shown in FIG. 1, is constructed by housing items of electrical equipment such as a circuit breaker 21, first and second disconnecting switches 22 and 23, grounding switches 25, etc., inside a single first tank 20.

The first tank 20 is made of iron, is formed into a straight cylindrical shape, and is disposed such that a central axis thereof is generally horizontal. An interior portion of this first tank 20 is made airtight by mounting end flanges 20a to first and second ends thereof, and the first tank 20 is segregated into first, second, and third gas compartments 33a, 33b, and 33c by conical electrically-insulating spacers 28, a sulfur hexafluoride gas constituting an electrically-insulating gas being sealed inside each of the gas compartments 33a, 33b, and 33c at a predetermined pressure. Branch pipe portions 20b are disposed on the first tank 20 so as to front onto each of the first and third gas compartments 33a and 33c, and in addition a handhole 20c is disposed on the first tank 20 so as to front onto the second gas compartment 33b. A bushing 24 is also mounted to each of the branch pipe portions 20b of the first tank 20.

The circuit breaker 21 is constituted by an arc-extinguishing chamber 21E, conductors 21a, a mechanism portion 21b, a supporting electrical insulator 21c, a manual operation apparatus 21d, etc. This circuit breaker 21 is disposed inside the second gas compartment 33b of the first tank 20 so as to be supported in the first tank 20 by the supporting electrical insulator 21c such that a direction of an opening and closing operation of the arc-extinguishing chamber 21E is generally aligned with an axial direction of the first tank 20. A conductor 21a on the arc-extinguishing chamber 21E and a conductor 21a on the mechanism portion 21b are each supported by the conical electrically-insulating spacers 28.

The first disconnecting switches 22 are each composed of a movable contact portion 22a and a fixed contact portion 22b, and are disposed inside the first and third gas compartments 33a and 33c of the first tank 20 such that an opening and closing direction thereof is generally aligned with an axial direction of the first tank 20 with an electrode on the movable contact portion 22a of each connected to a conductor 21a. The circuit breaker 21 and the first disconnecting switches 22 are arranged generally in a straight line inside the first tank 20.

The second disconnecting switches 23 are each composed of a movable contact portion 23a and a fixed contact portion 23b, and are disposed inside the first and third gas compartments 33a and 33c of the first tank 20 such that an opening and closing direction thereof is in a direction vertical to the axial direction of the first tank 20 (that is, up and down in FIG. 1) with an electrode on the movable contact portion 23a of each connected to an electrode on the fixed contact portions 22b of the first disconnecting switches 22. These second disconnecting switches 23 are positioned in lower portions of the branch pipe portions 20b, an electrode on the fixed contact portion 23b of each being connected to a respective conductor 24a of the bushings 24.

The electrodes on the movable contact portions 22a and 23a of the first and second disconnecting switches 22 and 23 also serve as fixed contact portions of the respective grounding switches 25. The grounding switches 25 are disposed so as to enable grounding by placing the movable contact portions thereof (not shown) in contact with the electrodes on the movable contact portions 22a and 23a of the first and second disconnecting switches 22 and 23. Current transformers 26 are also disposed at first and second ends of the arc-extinguishing chamber 21E inside the first tank 20. In addition, voltage transformers 27 are disposed inside the first tank 20 so as to be connected to the electrodes on the fixed contact portions 23b of the second disconnecting switches 23 to enable line voltages to be measured.

A second standardized module TB11, as shown in FIG. 2, is constructed by housing items of electrical equipment such as a circuit breaker 21, first and second disconnecting switches 22 and 23, grounding switches 25, etc., inside a single second tank 20A.

The second tank 20A is made of iron, is formed into a straight cylindrical shape, and is disposed such that a central axis thereof is generally horizontal. An interior portion of this second tank 20A is made airtight by mounting end flanges 20a to first and second ends thereof, and the second tank 20A is segregated into first, second, and third gas compartments 33a, 33b, and 33c by conical electrically-insulating spacers 28, a sulfur hexafluoride gas constituting an electrically-insulating gas being sealed inside each of the gas compartments 33a, 33b, and 33c at a predetermined pressure. A branch pipe portion 20b is disposed on the second tank 20A so as to front onto the first gas compartment 33a, and in addition a handhole 20c is disposed on the second tank 20A so as to front onto the second gas compartment 33*b*. A bushing 24 is also mounted to the branch pipe portion 20*b* of the second tank 20A.

The circuit breaker 21 is disposed inside the second gas compartment 33*b* of the second tank 20A so as to be supported in the second tank 20A by the supporting electrical insulator 21*c* such that a direction of an opening and closing operation of the arc-extinguishing chamber 21E is generally aligned with an axial direction of the second tank 20A. A conductor 21*a* on the arc-extinguishing chamber 21E and a conductor 21*a* on the mechanism portion 21*b* are each supported by the conical electrically-insulating spacers 28.

The first disconnecting switch 22 is disposed inside the third gas compartment 33*a* of the second tank 20A such that an opening and closing direction thereof is generally aligned with an axial direction of the second tank 20A with an electrode on the movable contact portion 22*a* connected to a conductor 2 l*a*. In addition, the second disconnecting switch 23 is disposed inside the first gas compartment 33*a* of the second tank 20A such that an opening and closing direction thereof is in a direction vertical to the axial direction of the second tank 20A (that is, up and down in FIG. 2) with an electrode on the movable contact portion 23*a* connected to a conductor 21*a*. This second disconnecting switch 23 is positioned in a lower portion of the branch pipe portion 20*b*, an electrode on the fixed contact portion 23*b* being connected to a conductor 24*a* of the bushing 24.

The electrodes on the movable contact portions 22*a* and 23*a* of the first and second disconnecting switches 22 and 23 also serve as fixed contact portions of the respective grounding switches 25. The grounding switches 25 are disposed so as to enable grounding by placing the movable contact portions thereof (not shown) in contact with the electrodes on the movable contact portions 22*a* and 23*a* of the first and second disconnecting switches 22 and 23. Current transformers 26 are also disposed at first and second ends of the arc-extinguishing chamber 21E inside the second tank 20A.

In Embodiment 1, one first standardized module TB2 and two second standardized modules TB11 each formed by housing items of electrical equipment such as the circuit breakers 21, the disconnecting switches 22 and 23, and the grounding switches 25, etc., together inside a first or second single tank 20 or 20A, respectively, are installed on site in series in a single row and electrically connected to each other to construct a hybrid gas-insulated switchgear constituting an electrical circuit of a single-line diagram unit (hereinafter called a "bay") of the phase-separated 1½ circuit breaker (CB) system shown in FIGS. 3 and 4.

Next, an installation operation for the hybrid gas-insulated switchgear according to Embodiment 1 will be explained.

First, the first and second standardized modules TB2 and TB11 and the bushings 24 are assembled at a factory and transported to the site. At this time, the bushings 24 are not yet mounted to the standardized modules TB2 and TB11, and opening portions of the branch pipe portions 20*b* are covered by blanking disks (not shown).

Then, the first standardized module TB2 is installed in a predetermined position on the site, and the second standardized modules TB11 are installed on the site in a single row so as to be positioned at first and second ends of the first standardized module TB2 such that the central axes of the first and second tanks 20 and 20A are generally aligned.

Next, the facing end flanges 20*a* of the first and second standardized modules TB11 and TB2 are removed, and the adjacent first and second standardized modules TB11 and TB2 are connected to each other by bellows 29. Then, conductors 32 are inserted into the bellows 29 through openings of the bellows 29, and the electrodes on the fixed contact portions 22*a* of the facing first disconnecting switches 22 of the first and second standardized modules TB11 and TB2 are linked together by the conductors 32. Then, the openings of the bellows 29 are covered. Further, the blanking disks are removed and the bushings 24 are mounted to each of the branch pipe portions 20*b*. In addition, the electrodes on the fixed contact portions 23*b* of the second disconnecting switches 23 of the first and second standardized modules TB11 and TB2 and the respective conductors 24*a* of the bushings 24 are connected to each other. Thereafter, the gas compartments 33*a*, 33*b*, and 33*c* of the tanks 20 and 20A are filled with the sulfur hexafluoride gas and sealed.

In this manner, installation of the hybrid gas-insulated switchgear constituting the electrical circuit of the 1½ CB system bay shown in FIGS. 3 and 4 is completed. Hybrid gas-insulated switchgears for three phases, for example, may be installed together at the site to constitute the lines of an electrical facility such as a transformer station, a generating station, etc. Finally, these hybrid gas-insulated switchgears are connected to main buses, overhead power lines, transformers, etc., by means of the bushings 24 to construct the desired electrical circuit for the electrical facility.

According to Embodiment 1, one first standardized module TB2 and two second standardized modules TB11 each formed by housing items of electrical equipment such as the circuit breakers 21, the disconnecting switches 22 and 23, and the grounding switches 25, etc., together inside a first or second single tank 20 or 20A, respectively, are installed in series in a single row and electrically connected to each other to construct a hybrid gas-insulated switchgear constituting an electrical circuit of a 1½ circuit breaker (CB) system bay. Thus, the number of tanks used is significantly reduced compared to when equipment is used in which the circuit breakers, the disconnecting switches, the grounding switches, etc., are each housed inside separate tanks, and electrically-insulating spacers disposed between the tanks are no longer necessary, enabling reductions in size and cost, and also enabling space saving in the installation area proportionate to the reduction in the number of inter-tank connections. Furthermore, because the diameters of the tanks 20 and 20A can be made uniform, inter-tank linking is facilitated.

When an electrical facility is being newly constructed or added to, because standardized modules assembled at a factory are transported to the site, and the standardized modules are arranged and connected at the site, the on-site installation workload is reduced, enabling installation time to be shortened.

Because the voltage transformers 27 are disposed inside the tanks 20 and 20A, air-insulated voltage transformers for measuring line voltages can be omitted.

Each of the tanks 20 and 20A is constructed so as to be divided into three gas compartments 33*a*, 33*b*, and 33*c*. Thus, when an inspection of the circuit breaker 21 in the first standardized module TB2 is to be performed, for example, the circuit breaker 21 is electrically insulated from the system by opening the second disconnecting switches 23 inside the gas compartments 33*a* and 33*c* at the first and second ends of the tank 20 of the first standardized module TB2 and removing the sulfur hexafluoride gas from the respective gas compartments 33*a* and 33*c*, then the worker enters the tank 20 through the handhole 20*c* to perform the inspection of the circuit breaker 21. Thus, the inspection of the circuit breaker 21 can be performed without switching off the system power supply. In other words, the inspection of subject equipment can be performed while keeping the region of system service interruption to a minimum.

Because one first standardized module TB2 and two second standardized modules TB11 are installed in series in a single row and electrically connected to each other to construct a hybrid gas-insulated switchgear constituting an electrical circuit of a 1½ circuit breaker (CB) system bay, the modules can be connected to each other by gas-insulated buses (the bellows 29 and the conductors 32) instead of bushings, enabling space saving in the installation area.

Embodiment 2

In Embodiment 1 above, the present invention is applied to a 1½ CB system bay, but in Embodiment 2, the present invention is applied to a 1⅓ CB system bay.

Figure 5:
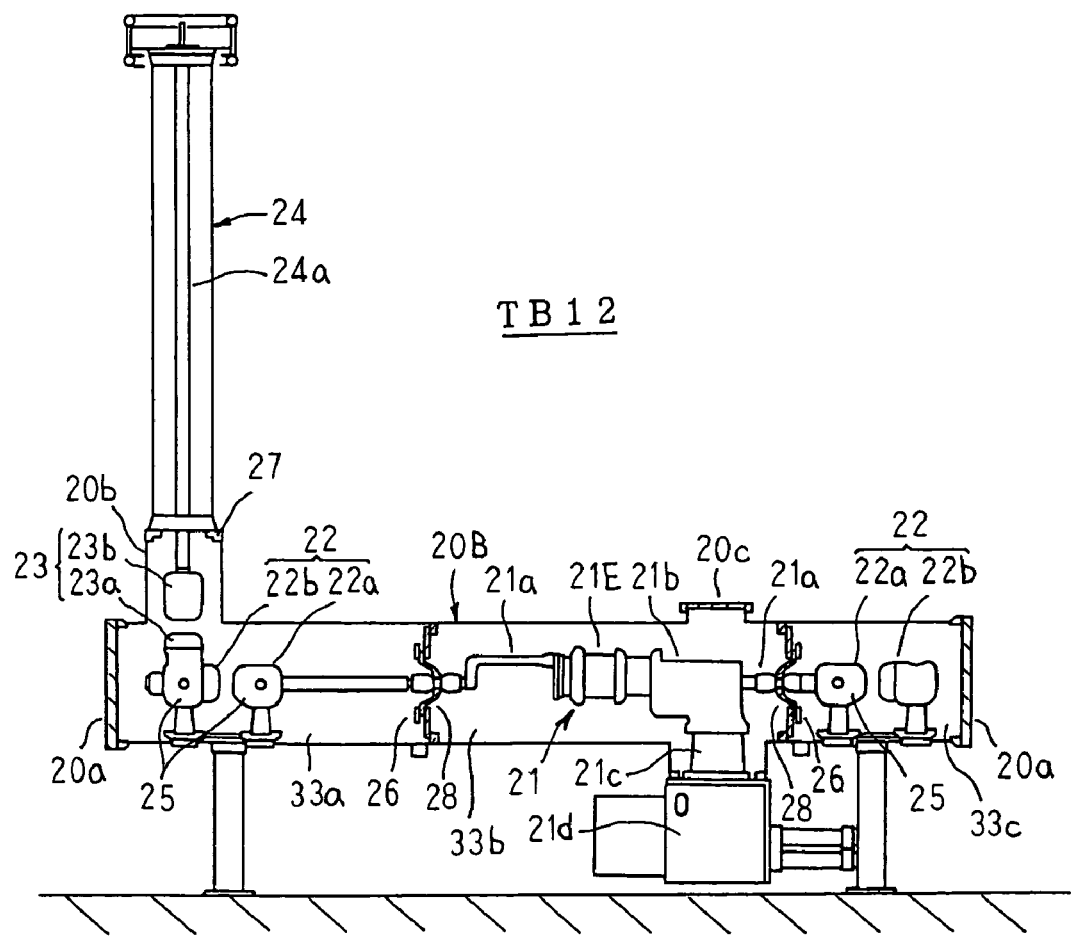
FIG. 5 is a cross section showing a third standardized module TB12 constituting part of a hybrid gas-insulated switchgear according to Embodiment 2 of the present invention.
Figure 6:
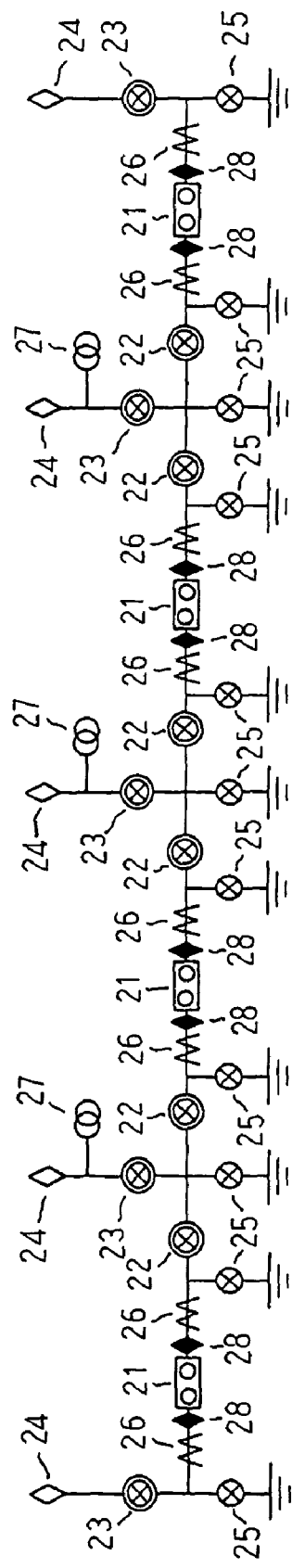
FIG. 6 is an electrical circuit diagram showing a single-line diagram unit of a 1⅓ circuit breaker system according to Embodiment 2 of the present invention.
Figure 7:
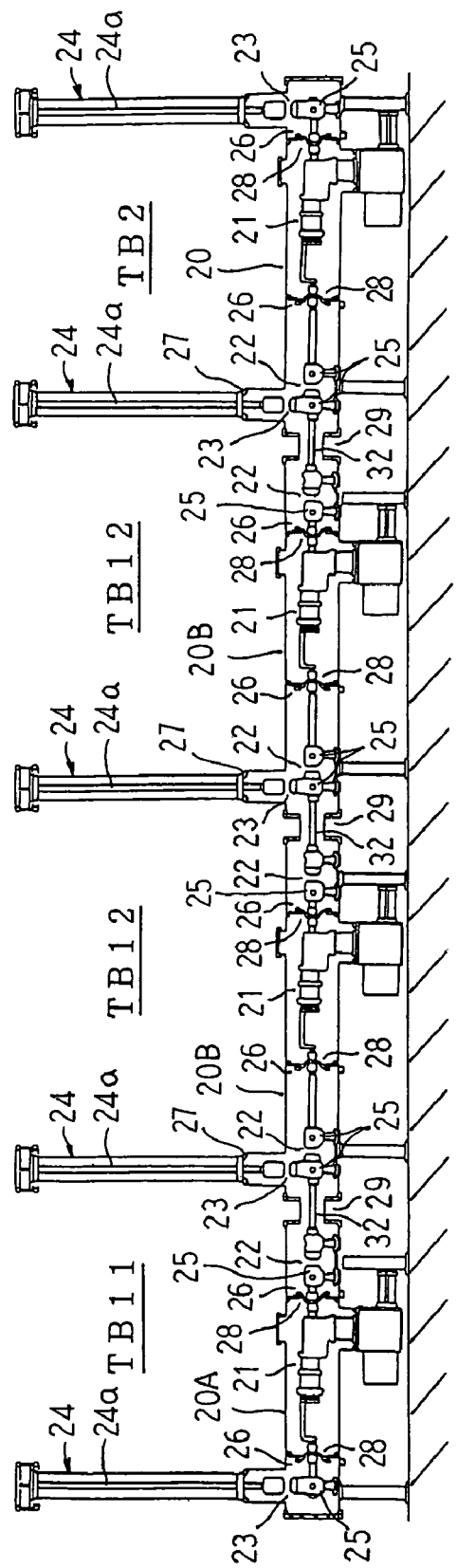
FIG. 7 is a configuration diagram of the hybrid gas-insulated switchgear constituting the single-line diagram unit of the 1⅓ circuit breaker system according to Embodiment 2 of the present invention.

FIG. 5 is a cross section showing a third standardized module TB12 constituting part of a hybrid gas-insulated switchgear according to Embodiment 2 of the present invention, FIG. 6 is an electrical circuit diagram showing a single-line diagram unit of a 1⅓ circuit breaker system according to Embodiment 2 of the present invention, and FIG. 7 is a configuration diagram of the hybrid gas-insulated switchgear constituting the single-line diagram unit of the 1⅓ circuit breaker system according to Embodiment 2 of the present invention.

A third standardized module TB12, as shown in FIG. 5, is constructed by housing items of electrical equipment such as a circuit breaker 21, first and second disconnecting switches 22 and 23, grounding switches 25, etc., inside a single third tank 20B.

The third tank 20B is made of iron, is formed into a straight cylindrical shape, and is disposed such that a central axis thereof is generally horizontal. An interior portion of this third tank 20B is made airtight by mounting end flanges 20a to first and second ends thereof, and the third tank 20B is segregated into first, second, and third gas compartments 33a, 33b, and 33c by conical electrically-insulating spacers 28, a sulfur hexafluoride gas constituting an electrically-insulating gas being sealed inside each of the gas compartments 33a, 33b, and 33c at a predetermined pressure. A branch pipe portion 20b is disposed on the third tank 20B so as to front onto the first gas compartment 33a, and in addition a handhole 20c is disposed on the third tank 20B so as to front onto the second gas compartment 33b. A bushing 24 is also mounted to the branch pipe portion 20b of the third tank 20B.

The circuit breaker 21 is disposed inside the second gas compartment 33b of the third tank 20B so as to be supported in the third tank 20B by the supporting electrical insulator 21c such that a direction of an opening and closing operation of the arc-extinguishing chamber 21E is generally aligned with an axial direction of the third tank 20B. A conductor 21a on the arc-extinguishing chamber 21E and a conductor 21a on the mechanism portion 21b are each supported by the conical electrically-insulating spacers 28.

The first disconnecting switches 22 are disposed inside the first and third gas compartments 33a and 33c, respectively, of the third tank 20B such that an opening and closing direction thereof is generally aligned with an axial direction of the third tank 20B with an electrode on the movable contact portion 22a of each connected to a conductor 21a. In addition, the second disconnecting switch 23 is disposed inside the first gas compartment 33a of the third tank 20B such that an opening and closing direction thereof is in a direction vertical to the axial direction of the third tank 20B (that is, up and down in FIG. 5) with an electrode on the movable contact portion 23a connected to an electrode on a fixed contact portion 22b of one of the first disconnecting switches 22. This second disconnecting switch 23 is positioned in a lower portion of the branch pipe portion 20b, an electrode on the fixed contact portion 23b being connected to a conductor 24a of the bushing 24.

The electrodes on the movable contact portions 22a and 23a of the first and second disconnecting switches 22 and 23 also serve as fixed contact portions of the respective grounding switches 25. The grounding switches 25 are disposed so as to enable grounding by placing the movable contact portions thereof (not shown) in contact with the electrodes on the movable contact portions 22a and 23a of the first and second disconnecting switches 22 and 23. Current transformers 26 are also disposed at first and second ends of the arc-extinguishing chamber 21E inside the third tank 20B. In addition, voltage transformers 27 are disposed inside the third tank 20B so as to be connected to the electrodes on the fixed contact portions 23b of the second disconnecting switches 23 to enable line voltages to be measured.

In Embodiment 2, one first standardized module TB2, one second standardized module TB11, and two third standardized modules TB12 each formed by housing items of electrical equipment such as the circuit breakers 21, the disconnecting switches 22 and 23, and the grounding switches 25, etc., together inside a first, second, or third single tank 20, 20A, or 20B, respectively, are installed on site in series and connected to construct a hybrid gas-insulated switchgear of the phase-separated 1⅓ CB system bay shown in FIGS. 6 and 7.

Next, an installation operation for the hybrid gas-insulated switchgear according to Embodiment 2 will be explained.

First, the first, second, and third standardized modules TB2, TB11, and TB12 and the bushings 24 are assembled at a factory and transported to the site. At this time, the bushings 24 are not yet mounted to the standardized modules TB2, TB11, and TB12 and opening portions of the branch pipe portions 20b are covered by blanking disks (not shown).

Then, the two third standardized modules TB12 are installed in a predetermined position on the site so as to line up in series such that the central axes of the third tanks 20B are generally aligned, and the first and second standardized modules TB2 and TB11 are installed on the site so as to be positioned at first and second ends of the aligned third standardized modules TB12 in a single row such that the central axes of the first, second, and third tanks 20, 20A, and 20B are generally aligned.

Next, the facing end flanges 20a of the two third standardized modules TB12 are removed, and the adjacent third standardized modules TB12 are connected to each other by a bellows 29. Then, a conductor 32 is inserted into the bellows 29 from an opening of the bellows 29, and the electrodes on the fixed contact portions 22a of the facing first disconnecting switches 22 of the two third standardized modules TB12 are linked together by the conductor 32. Then, the opening of the bellows 29 is covered. Further, the blanking disk of the third standardized module TB12 (on the right in FIG. 7) is removed and a bushing 24 is mounted to the branch pipe portion 20b. In addition, the electrode on the fixed contact portion 23b of the second disconnecting switch 23 of the third standardized module TB12 (on the right in FIG. 7) and the conductor 24a of the respective bushing 24 are connected to each other.

Next, the facing end flanges 20a of the second and third standardized modules TB11 and TB12 are removed, and the adjacent second and third standardized modules TB11 and TB12 are connected to each other by a bellows 29. Then, a conductor 32 is inserted into the bellows 29 from an opening of the bellows 29, and the electrodes on the fixed contact portions 22a of the facing first disconnecting switches 22 of the second and third standardized modules TB11 and TB12 are linked together by the conductor 32. Then, the opening of the bellows 29 is covered. Further, the blanking disks are removed and the bushings 24 are mounted to each of the branch pipe portions 20b. In addition, the electrodes on the fixed contact portions 23b of the second disconnecting switches 23 of the second and third standardized modules TB11 and TB12 and the respective conductors 24a of the bushings 24 are connected to each other.

Next, the facing end flanges 20a of the first and third standardized modules TB2 and TB12 are removed, and the adjacent first and third standardized modules TB2 and TB12 are connected to each other by a bellows 29. Then, a conductor 32 is inserted into the bellows 29 from an opening of the bellows 29, and the electrodes on the fixed contact portions 22a of the facing first disconnecting switches 22 of the first and third standardized modules TB2 and TB12 are linked together by the conductor 32. Then, the opening of the bellows 29 is covered. Further, the blanking disks of the first standardized module TB2 are removed and bushings 24 are mounted to each of the branch pipe portions 20b. In addition, the electrodes on the fixed contact portions 23b of the two second disconnecting switches 23 of the first standardized module TB2 and the respective conductors 24a of the bushings 24 are connected to each other.

Thereafter, the gas compartments 33a, 33b, and 33c of the tanks 20, 20A, and 20B are filled with the sulfur hexafluoride gas and-sealed.

In this manner, installation of the hybrid gas-insulated switchgear constituting the 1⅓ CB system bay shown in FIGS. 6 and 7 is completed. Hybrid gas-insulated switchgears for three phases, for example, may be installed together at the site to constitute the lines of an electrical facility such as a transformer substation, a generating station, etc. Finally, these hybrid gas-insulated switchgears are connected to main buses, overhead power lines, transformers, etc., by means of the bushings 24.

Consequently, similar effects to those in Embodiment 1 above can also be achieved in Embodiment 2.

Moreover, in Embodiments 1 and 2 above, a 1½ CB system or a 1⅓ CB system bay is explained as being constructed by arranging and connecting a plurality of standardized modules in series, but similar effects can also be achieved if a ring bus system bay is constructed using a plurality of the standardized modules of the present invention.

Embodiment 3

Figure 8:
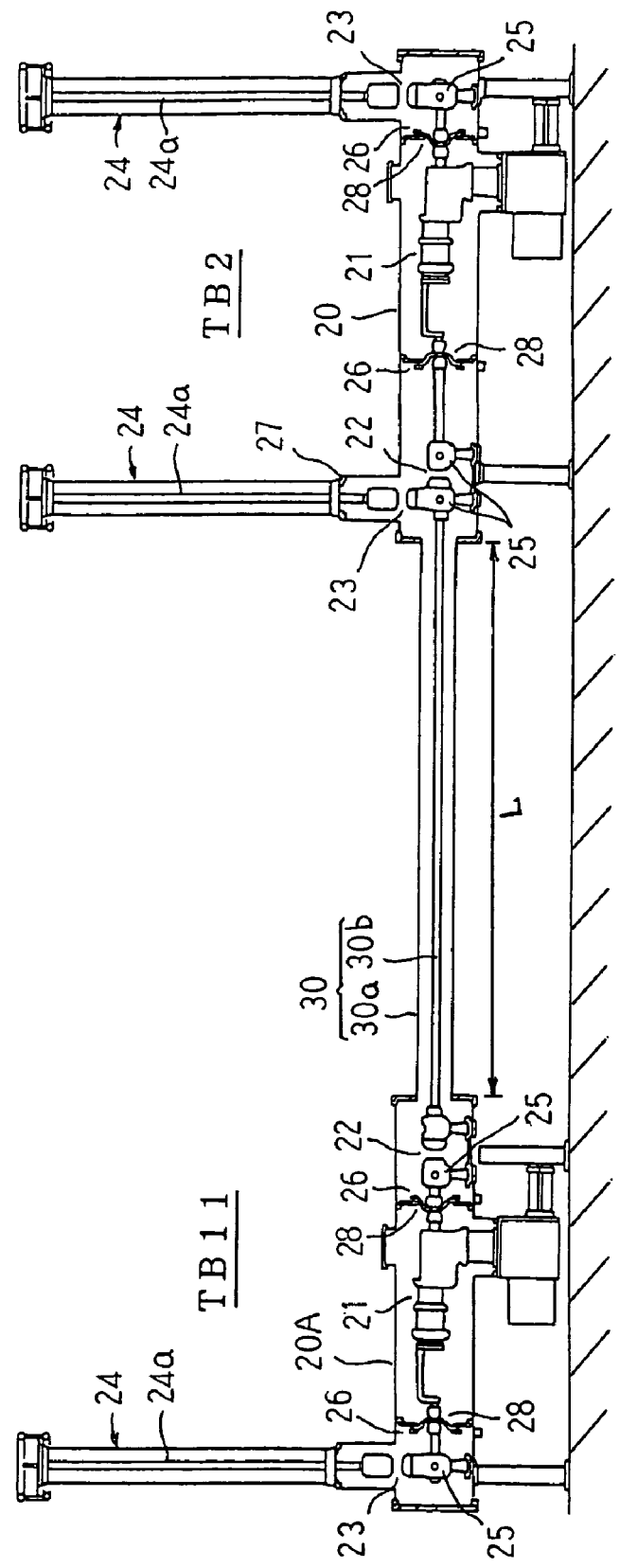
FIG. 8 is a cross section showing a configuration of a hybrid gas-insulated switchgear according to Embodiment 3 of the present invention.
Figure 9:
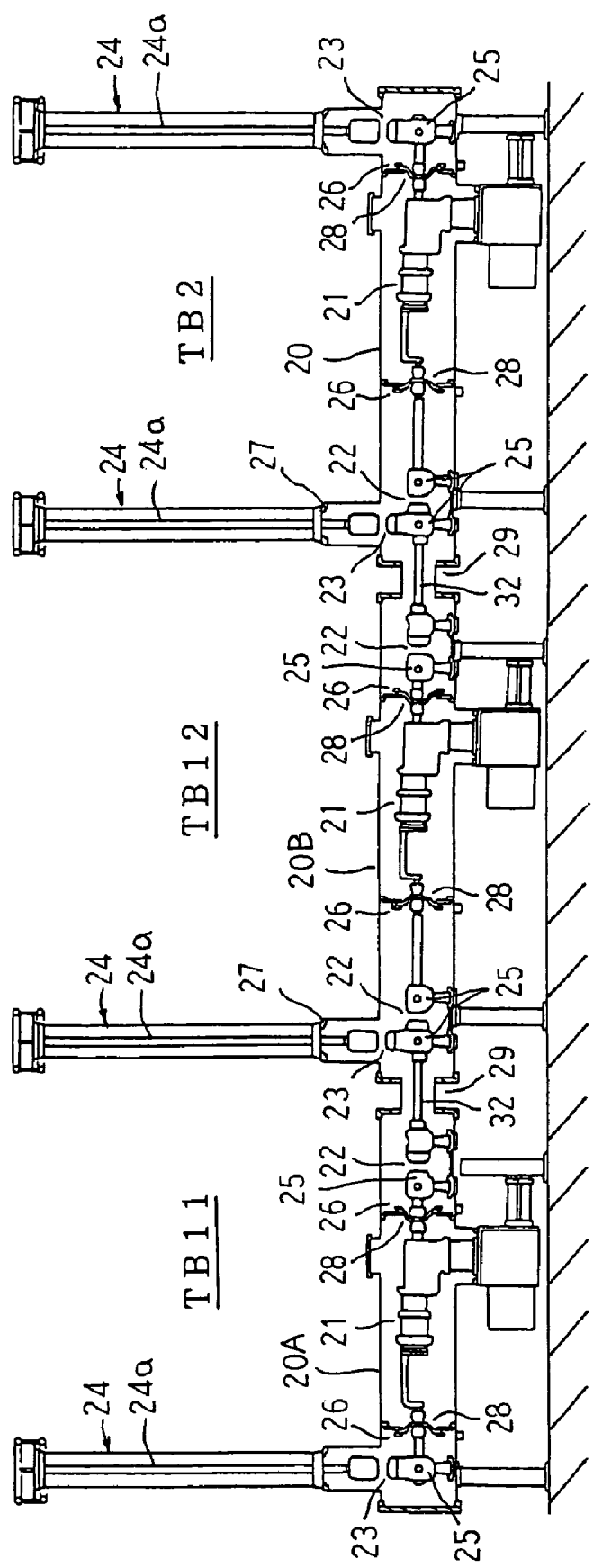
FIG. 9 is a cross section showing a hypothetical additional configuration of the hybrid gas-insulated switchgear according to Embodiment 3 of the present invention.

FIG. 8 is a cross section showing a configuration of a hybrid gas-insulated switchgear according to Embodiment 3 of the present invention, and FIG. 9 is a cross section showing a hypothetical additional configuration of the hybrid gas-insulated switchgear according to Embodiment 3 of the present invention.

In Embodiment 3, a bay is constructed on the assumption that a third standardized module TB12 will be added in the future with the objective of connecting to overhead power lines, a transformer, etc.

In other words, as shown in FIG. 8, a first standardized module TB2 having two bushings 24 for connection to a main bus and a transformer/overhead power line and a second standardized module TB11 having a bushing 24 for connection to a main bus are disposed in a single row in series such that the central axes of the first and second tanks 20 and 20A are generally aligned so as to be separated by a distance (L) equivalent to a length of the third standardized module TB12. Then, the facing end flanges 20a of the first and second standardized modules TB2 and TB11 are removed, and a gas-insulated bus 30 is disposed between the first and second standardized modules TB2 and TB11. The gas-insulated bus 30 is constituted by: a cylindrical container tank 30a functioning as a container; and a bus 30b functioning as a conductor wire disposed at a position of a central axis of the container tank 30a. The bay is constructed by mounting the container tank 30a airtightly to the first and second tanks 20 and 20A of the first and second standardized modules TB2 and TB11, and connecting the bus 30b between the electrodes on the fixed contact portions 22b of the facing first disconnecting switches 22 of the first and second standardized modules TB2 and TB11. Moreover, the container tank 30a is filled with the sulfur hexafluoride gas and sealed.

Then, when the third standardized module TB12 is added during expansion of the electrical facility, first the gas-insulated bus 30 is removed from the first and second standardized modules TB2 and TB11. Next, the third standardized module TB12 is installed between the first and second standardized modules TB2 and TB11, and both end flanges 20a of the third standardized module TB12 are removed. Then, the tanks 20A and 20B of the second and third standardized modules TB11 and TB12 are connected to each other by a bellows 29. Next, a conductor 32 is inserted into the bellows 29 from an opening of the bellows 29, and the electrodes on the fixed contact portions 22a of the facing first disconnecting switches 22 of the second and third standardized modules TB11 and TB12 are connected to each other by the conductor 32. Then, the opening of the bellows 29 is covered. Further, the blanking disk is removed and a bushing 24 is mounted to the branch pipe portion 20b of the third standardized module TB12. In addition, the electrode on the fixed contact portion 23b of the second disconnecting switch 23 of the third standardized module TB12 and the conductor 24a of the bushing 24 are connected to each other. Similarly, the first and third tanks 20 and 20B are connected to each other by a bellows 29. Next, a conductor 32 is inserted into the bellows 29 from an opening of the bellows 29, and the electrodes on the fixed contact portions 22a of the facing first disconnecting switches 22 of the first and third standardized modules TB2 and TB12 are connected to each other by the conductor 32. Then, the opening of the bellows 29 is covered. Thereafter, the gas compartments 33a, 33b, and 33c of the tanks 20, 20A, and 20B are filled with the sulfur hexafluoride gas and sealed to complete the addition to the electrical facility.

Thus, a circuit constituting a 1½ CB system bay of the kind shown in FIG. 9 can be achieved. The hybrid gas-insulated switchgear constructed in this manner can be connected to an overhead power line, a transformer, etc., by means of the bushing 24 of the added third standardized module TB12.

Thus, because the first and second standardized modules TB2 and TB11 are installed in series in a single row so as to be separated by a distance (L) equivalent to a length of a third standardized module TB12 to allow for the future additional installation of the third standardized module TB12, and the first and second standardized modules TB2 and TB11 are connected to each other using the gas-insulated bus 30, the third standardized module TB12 can be added by removing the gas-insulated bus 30. Whereby, the addition work required when the third standardized module TB12 is added is reduced significantly, enabling the construction time to be shortened.

Embodiment 4

Figure 10:
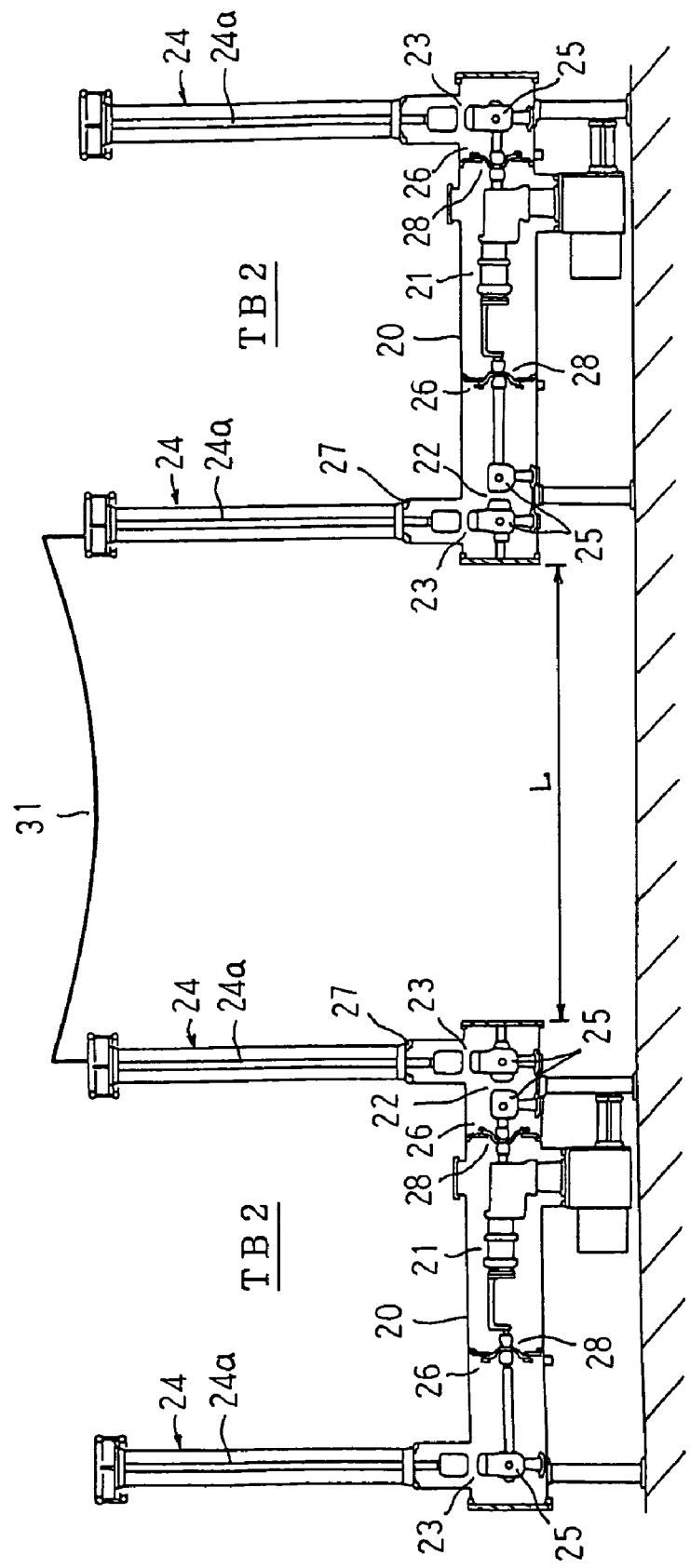
FIG. 10 is a cross section showing a configuration of a hybrid gas-insulated switchgear according to Embodiment 4 of the present invention.
Figure 11:
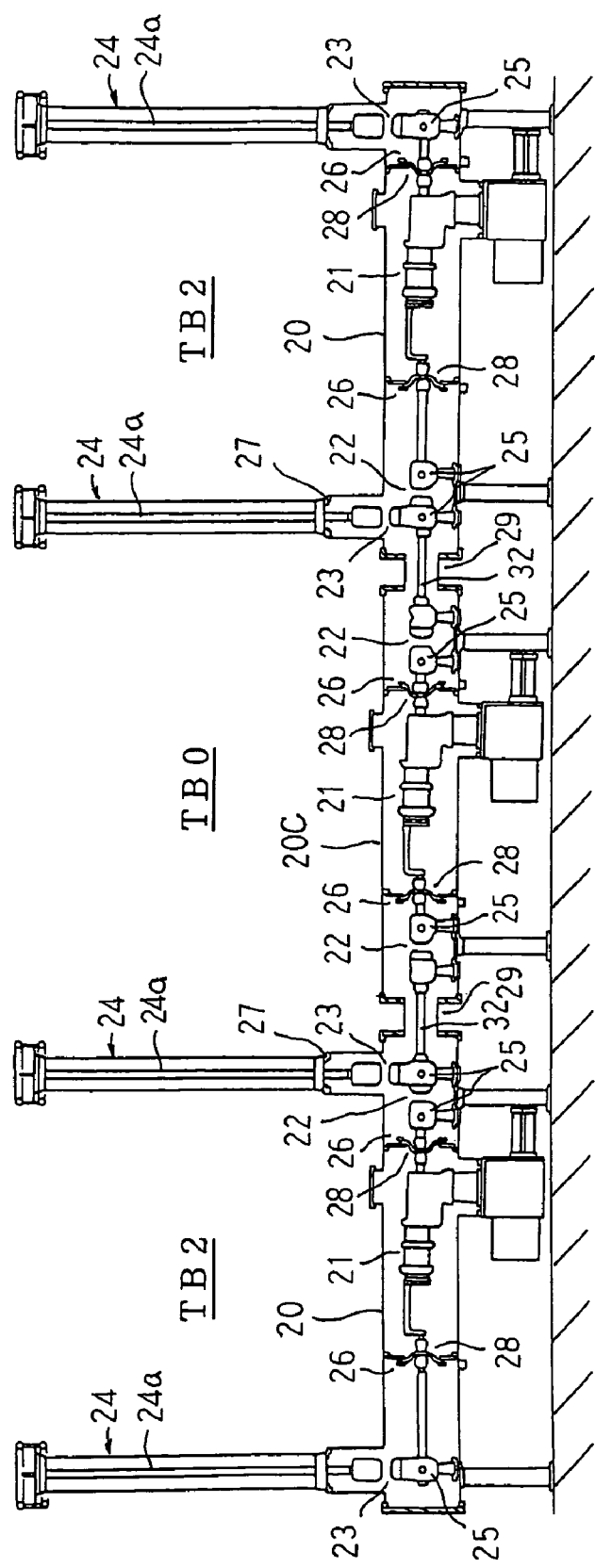
FIG. 11 is a cross section showing a hypothetical additional configuration of the hybrid gas-insulated switchgear according to Embodiment 4 of the present invention.
Figure 12:
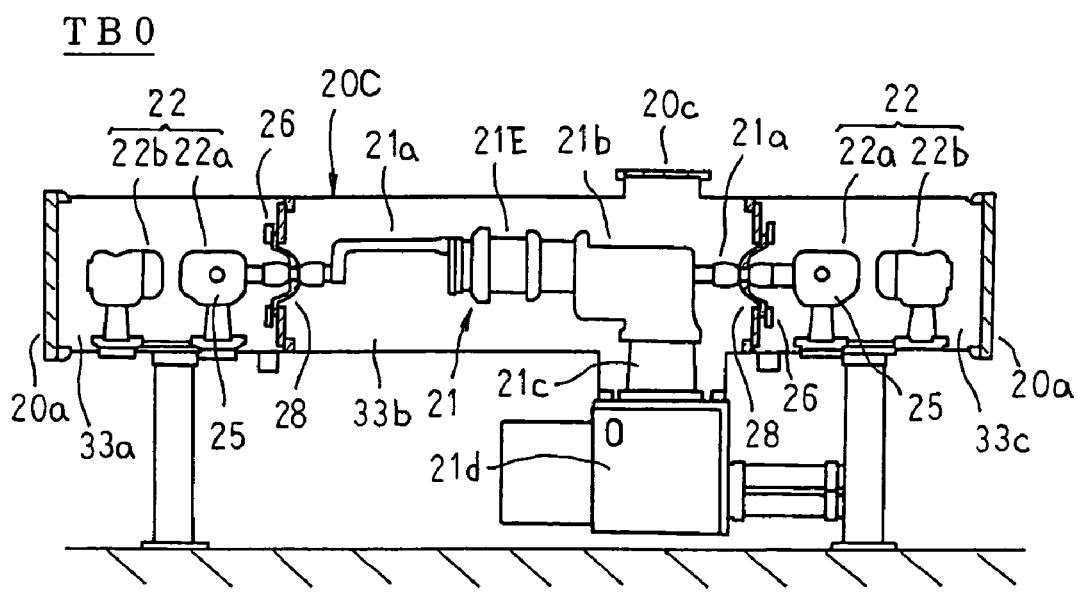
FIG. 12 is a cross section showing a fourth standardized module TB0 constituting part of the hybrid gas-insulated switchgear according to Embodiment 4 of the present invention.

FIG. 10 is a cross section showing a configuration of a hybrid gas-insulated switchgear according to Embodiment 4 of the present invention, FIG. 11 is a cross section showing a hypothetical additional configuration of the hybrid gas-insulated switchgear according to Embodiment 4 of the present invention, and FIG. 12 is a cross section showing a fourth standardized module TB0 constituting part of the hybrid gas-insulated switchgear according to Embodiment 4 of the present invention.

In Embodiment 4, a single-line diagram unit is constructed on the assumption that a fourth standardized module TB0 will be added in the future with the objective of connecting to overhead power lines, a transformer, etc. In other words, as shown in FIG. 10, two first standardized modules TB2 having two bushings 24 for connection to a main bus and an overhead power line 31 are disposed in a single row in series such that the central axes of the tanks 20 are generally aligned so as to be separated by a distance (L) equivalent to a length of a fourth standardized module TB0 to allow for the future additional installation of the fourth standardized module TB0. A bay is constructed by connecting the bushings 24 of the first standardized modules TB2 to each other by the overhead power line 31.

Then, when the fourth standardized module TB0 is added during expansion of the electrical facility, first the overhead power line 31 is removed from the bushings 24. Next, the fourth standardized module TB0 is installed between the first standardized modules TB2, both end flanges 20a of the fourth standardized module TB0 are removed, and the end flanges 20a of the first standardized modules TB2 facing the fourth standardized module TB0 are similarly removed. Then, the electrodes on the fixed contact portions 22a of the facing first disconnecting switches 22 of the first and fourth standardized modules TB2 and TB0 are connected to each other by conductors 32. The tanks 20 and 20C of the first and fourth standardized modules TB2 and TB0 are connected to each other by a bellows 29. Thereafter, the gas compartments 33a, 33b, and 33c of the tanks 20 and 20C are filled with the sulfur hexafluoride gas and sealed to complete the addition to the electrical facility.

Thus, an electrical circuit constituting a 1½ CB system bay of the kind shown in FIG. 11 can be achieved. The hybrid gas-insulated switchgear constructed in this manner can be connected to an overhead power line, a transformer, etc., by means of the bushings 24 of the first standardized modules TB2.

Thus, because the two first standardized modules TB2 are installed in series in a single row so as to be separated by a distance (L) equivalent to a length of a fourth standardized module TB0 to allow for the future additional installation of the fourth standardized module TB0, and the bushings 24 are connected to each other using the overhead power line 31, the fourth standardized module TB0 can be added by removing the overhead power line 31. Whereby, the addition work required when the fourth standardized module TB0 is added is reduced significantly, enabling the construction time to be shortened.

Here, the fourth standardized module TB0, as shown in FIG. 12, is constructed by housing items of electrical equipment such as a circuit breaker 21, first disconnecting switches 22, grounding switches 25, etc., inside a single fourth tank 20C.

The fourth tank 20C is made of iron, is formed into a straight cylindrical shape, and is disposed such that a central axis thereof is generally horizontal. An interior portion of this fourth tank 20C is made airtight by mounting end flanges 20a to first and second ends thereof, and the fourth tank 20C is segregated into first, second, and third gas compartments 33a, 33b, and 33c by conical electrically-insulating spacers 28, a sulfur hexafluoride gas constituting an electrically-insulating gas being sealed inside each of the gas compartments 33a, 33b, and 33c at a predetermined pressure. A handhole 20c is disposed on the fourth tank 20C so as to front onto the second gas compartment 33b.

The circuit breaker 21 is disposed inside the second gas compartment 33b of the fourth tank 20C so as to be supported in the fourth tank 20C by the supporting electrical insulator 21c such that a direction of an opening and closing operation of the arc-extinguishing chamber 21E is generally aligned with an axial direction of the fourth tank 20C. A conductor 21a on the arc-extinguishing chamber 21E and a conductor 21a on the mechanism portion 21b are each supported by the conical electrically-insulating spacers 28.

The first disconnecting switches 22 are disposed inside the first and third gas compartments 33a and 33c, respectively, of the fourth tank 20C such that an opening and closing direction thereof is generally aligned with an axial direction of the fourth tank 20C with an electrode on the movable contact portion 22a of each connected to a conductor 21a.

The electrodes on the movable contact portions 22a of the first disconnecting switches 22 also sieve as fixed contact portions of the respective grounding switches 25. The grounding switches 25 are disposed so as to enable grounding by placing the movable contact portions thereof (not shown) in contact with the electrodes on the movable contact portions 22a of the first disconnecting switches 22. Current transformers 26 are also disposed at first and second ends of the arc-extinguishing chamber 21E inside the fourth tank 20C.

Moreover, the standardized modules according to the present invention have a basic construction provided with: a cylindrical tank disposed such that an axial direction thereof is generally horizontal; a circuit breaker disposed inside the tank such that a direction of an opening and closing operation thereof is generally aligned with the axial direction of the tank; disconnecting switches disposed at first and second ends of the circuit breaker inside the tank; and grounding switches disposed between the circuit breaker and the disconnecting switches, the tank being filled with an electrically-insulating gas and sealed, and it goes without saying that other items of electrical equipment such as lightning arresters, etc., may also be disposed inside the tank when required. In other words, the standardized modules are constructed by dividing a single-line diagram unit into a plurality of electrical circuits and housing the items of electrical equipment constituting each of the divided electrical circuits together in single tanks.

What is claimed is:

1. A hybrid gas-insulated switchgear comprising a plurality of modules, each module being provided with:
   a cylindrical tank disposed such that an axial direction thereof is substantially horizontal, said tank being filled with an electrically-insulating gas and sealed,
   a circuit breaker disposed inside said tank such that a direction of an opening and closing operation thereof is substantially aligned with said axial direction of said tank;

disconnecting switches disposed at first and second ends of said circuit breaker inside said tank, said disconnecting switches being electrically connected to said circuit breaker; and grounding switches electrically connected between said circuit breaker and said disconnecting switches, wherein said plurality of modules is arranged in a single row such that central axes of said tanks are substantially aligned and said plurality of modules is electrically connected to each other to constitute a single-line diagram unit, wherein:

at least one pair of adjacent modules among said plurality of modules is arranged so as to be separately by a distance equivalent to a length of one of said modules.

2. The hybrid gas-insulated switchgear according to claim 1, wherein:

said tanks of said pair of adjacent modules arranged so as to be separated by said distance equivalent to said length of said module are airtightly linked to each other by means of a container of a gas-insulated bus; and facing disconnecting switches of said pair of adjacent modules arranged so as to be separated by said distance equivalent to said length of said module are electrically connected to each other by means of a conductor wire of said gas-insulated bus.

3. The hybrid gas-insulated switchgear according to claim 1, wherein:

bushings are disposed above facing disconnecting switches of said pair of adjacent modules arranged so as to be separated by said distance equivalent to said length of said module, said facing disconnecting switches of said pair of adjacent modules arranged so as to be separated by said distance equivalent to said length of said module being electrically connected to each other by means of an overhead power line suspended between said bushings.

4. A hybrid gas-insulated switchgear comprising a plurality of modules, each module being provided with:

a cylindrical tank disposed such that an axial direction thereof is substantially horizontal, said tank being filled with an electrically-insulating gas and sealed, a circuit breaker disposed inside said tank such that a direction of an opening and closing operation thereof is substantially aligned with said axial direction of said tank;

disconnecting switches disposed at first and second ends of said circuit breaker inside said tank, said disconnecting switches being electrically connected to said circuit breaker; and grounding switches electrically connected between said circuit breaker and said disconnecting switches, wherein said plurality of modules is arranged in a single row such that central axes of said tanks are substantially aligned and said plurality of modules is electrically connected to each other to constitute a single-line diagram unit, wherein:

said tanks of said modules are segregated into first, second, and third gas compartments in an axial direction by electrically-insulating spacers, said circuit breaker being disposed inside said second gas compartment and said disconnecting switches being disposed inside said first and third gas compartments.

* * * * *